(12) United States Patent
Solomko et al.

(10) Patent No.: US 10,778,278 B2
(45) Date of Patent: Sep. 15, 2020

(54) DEVICE INCLUDING A SWITCHING UNIT AND APPLICATIONS THEREOF

(71) Applicant: Infineon Technologies AG, Neubiberg (DE)

(72) Inventors: Valentyn Solomko, Munich (DE); Hans-Peter Friedrich, Munich (DE); Michael Wilhelm, Mammendorf (DE)

(73) Assignee: Infineon Technologies AG, Neubiberg (DE)

( * ) Notice: Subject to any disclaimer, the term of this patent is extended or adjusted under 35 U.S.C. 154(b) by 42 days.

(21) Appl. No.: 16/414,459

(22) Filed: May 16, 2019

(65) Prior Publication Data

US 2019/0273527 A1 Sep. 5, 2019

Related U.S. Application Data

(62) Division of application No. 15/444,962, filed on Feb. 28, 2017, now Pat. No. 10,333,578.

(30) Foreign Application Priority Data

Mar. 1, 2016 (DE) .................. 10 2016 103 666

(51) Int. Cl.
*H04B 1/401* (2015.01)
*H04B 1/00* (2006.01)

(52) U.S. Cl.
CPC ............. *H04B 1/401* (2013.01); *H04B 1/006* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 3,993,999 A | * | 11/1976 | Hemmi | ................... | H01Q 3/245 342/372 |
| 4,739,247 A | * | 4/1988 | Cisco | ..................... | H03H 7/255 323/354 |
| 4,969,819 A | * | 11/1990 | James | ...................... | G09B 9/40 342/13 |
| 5,170,488 A | * | 12/1992 | Furuya | .................. | H04W 36/30 455/437 |

(Continued)

FOREIGN PATENT DOCUMENTS

| CN | 2335313 Y | 8/1999 |
|---|---|---|
| CN | 1902870 A | 1/2007 |

(Continued)

OTHER PUBLICATIONS

Office Action dated Jul. 1, 2019 for Chinese Patent Application No. 201710116720.8.

(Continued)

*Primary Examiner* — Yuwen Pan
*Assistant Examiner* — Erica L Fleming-Hall
(74) *Attorney, Agent, or Firm* — Schiff Hardin LLP (57) ABSTRACT

A device includes a switching unit including N input ports and M output ports, wherein N≥M≥2. The switching unit is configured to selectively interconnect each of the M output ports with a different one of the N input ports. The device further includes M attenuators, wherein each of the M attenuators is electrically coupled to a different one of the M output ports of the switching unit.

20 Claims, 9 Drawing Sheets

(56) References Cited

U.S. PATENT DOCUMENTS

| | | | | |
|---|---|---|---|---|
| 5,287,543 | A * | 2/1994 | Wolkstein | H04B 7/2045 330/124 R |
| 5,446,370 | A * | 8/1995 | Voight | H04W 24/00 324/76.11 |
| 5,596,269 | A * | 1/1997 | Miller | H04Q 1/24 324/537 |
| 6,195,566 | B1 * | 2/2001 | Kanai | H04W 88/08 455/443 |
| 6,226,600 | B1 * | 5/2001 | Rodenberg, III | G01R 22/00 340/12.32 |
| 9,693,250 | B1 * | 6/2017 | Hou | H04W 24/08 |
| 9,831,940 | B2 * | 11/2017 | Patel | H04B 7/18584 |
| 10,009,060 | B2 * | 6/2018 | Chiang | H03H 11/1291 |
| 2005/0170790 | A1 * | 8/2005 | Chang | H04B 1/005 455/90.3 |
| 2006/0038710 | A1 | 2/2006 | Staszewski et al. | |
| 2006/0291589 | A1 | 12/2006 | Eliezer et al. | |
| 2009/0197551 | A1 | 8/2009 | Paraskake et al. | |
| 2009/0254956 | A1 | 10/2009 | Smychkovich et al. | |
| 2010/0093292 | A1 * | 4/2010 | Kim | H04B 1/006 455/127.3 |
| 2010/0130158 | A1 | 5/2010 | Khoini-Poorfard et al. | |
| 2010/0157858 | A1 * | 6/2010 | Lee | H01Q 9/40 370/297 |
| 2011/0175789 | A1 * | 7/2011 | Lee | H01Q 1/243 343/853 |
| 2011/0244820 | A1 | 10/2011 | Khoini-Poorfard et al. | |
| 2011/0248791 | A1 * | 10/2011 | Dupuy | H01P 1/15 333/101 |
| 2011/0256857 | A1 * | 10/2011 | Chen | H04B 1/525 455/422.1 |
| 2012/0194206 | A1 * | 8/2012 | Nagasaka | G01R 29/26 324/750.01 |
| 2014/0314407 | A1 * | 10/2014 | Bush | H04B 10/25751 398/45 |
| 2015/0036760 | A1 | 2/2015 | Pang et al. | |
| 2015/0091668 | A1 | 4/2015 | Solomko et al. | |
| 2015/0214972 | A1 | 7/2015 | Beckers et al. | |
| 2016/0261729 | A1 * | 9/2016 | Kim | H04B 1/005 |
| 2016/0380652 | A1 * | 12/2016 | Anthony | H03F 3/24 375/295 |
| 2017/0257135 | A1 | 9/2017 | Solomko et al. | |
| 2017/0373368 | A1 * | 12/2017 | Srirattana | H04B 1/0064 |
| 2018/0041234 | A1 | 2/2018 | Klopfer et al. | |
| 2018/0159561 | A1 * | 6/2018 | Han | H04B 1/006 |
| 2018/0175949 | A1 | 6/2018 | Rao et al. | |
| 2020/0014429 | A1 * | 1/2020 | Leung | H04B 1/0057 |

FOREIGN PATENT DOCUMENTS

| | | |
|---|---|---|
| CN | 101331395 A | 12/2008 |
| CN | 101413994 A | 4/2009 |
| CN | 102565674 A | 7/2012 |
| CN | 102571121 A | 7/2012 |
| CN | 102684716 A | 9/2012 |
| CN | 103134984 A | 6/2013 |
| CN | 204761429 U | 11/2015 |
| DE | 102011005688 A1 | 9/2011 |
| GB | 2519946 A | 5/2015 |
| JP | 2006-304081 A | 11/2006 |
| JP | 2007-515900 A | 6/2007 |
| KR | 2001-0012421 A | 2/2001 |
| KR | 2004-0026514 A | 3/2004 |
| KR | 2006-0016015 A | 2/2006 |
| KR | 2013-0052161 A | 5/2013 |
| KR | 2014-0064095 A | 5/2014 |

OTHER PUBLICATIONS

German Patent Office, Office Action issued for DE 102016103666.8, 9 pgs., Nov. 8, 2016.

Office Action dated Apr. 10, 2018 for Korean Patent Application No. 10-2017-0025769.

Office Action dated Nov. 2, 2018 for Chinese Patent Application No. 201710116720.8.

Office Action dated Jul. 29, 2019 for Korean Patent Application No. 10-2019-0011025.

* cited by examiner

DEVICE INCLUDING A SWITCHING UNIT AND APPLICATIONS THEREOF

CROSS-REFERENCE TO RELATED APPLICATIONS

The present application is a divisional application of U.S. patent application Ser. No. 15/444,962, filed on Feb. 28, 2017, which claims the benefit of the filing date of German Patent Application No. 102016103666.8, filed on Mar. 1, 2016, the contents of each of which are incorporated herein by reference in their entireties.

TECHNICAL FIELD

The present disclosure relates in general to electronic devices. More particular, the disclosure relates to devices including a switching unit and applications thereof.

BACKGROUND

Radio transceivers like portable cellular devices include an RF front end arranged between the digital baseband system and the antennas of the radio transceiver. Components of the RF front end, such as e.g. power amplifiers, and the antennas of the radio transceiver may be controlled and tuned during operation.

Mobile communication standards evolve over time, thereby providing novel technical features. For example, carrier aggregation represents an important feature for the mobile communication industry in 3GPP LTE-Advanced. In carrier aggregation, multiple uplink or downlink LTE carriers in contiguous or non-contiguous frequency bands may be bundled. Radio transceivers and their components need to be compatible with the evolving mobile communication standards.

SUMMARY OF THE INVENTION

In accordance with an aspect, a device includes a switching unit including N input ports and M output ports, wherein N≥M≥2. The switching unit is configured to selectively interconnect each of the M output ports with a different one of the N input ports. The device further includes M attenuators, wherein each of the M attenuators is electrically coupled to a different one of the M output ports of the switching unit.

In accordance with a further aspect, a device includes a single-pole double-throw switch including a first input port, a second input port and an output port. The device further includes a diplexer including an input port, a first output port and a second output port, wherein the input port of the diplexer is electrically coupled to the output port of the single-pole double-throw switch. The device further includes a first attenuator electrically coupled to the first output port of the diplexer and a second attenuator electrically coupled to the second output port of the diplexer.

In accordance with a further aspect, a device includes at least two directional couplers, wherein each of the directional couplers is configured to be arranged in an uplink transmission path of an RF front end. The device further includes an M-pole N-throw switch including N input ports and M output ports, wherein N≥M≥2. Each of the N input ports is electrically coupled to a coupled port of a directional coupler or an isolated port of a directional coupler.

BRIEF DESCRIPTION OF THE DRAWINGS/FIGURES

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. The elements of the drawings are not necessarily to scale relative to each other. Like reference signs may designate corresponding similar parts.

DETAILED DESCRIPTION

In the following detailed description, reference is made to the accompanying drawings, in which are shown by way of illustration specific aspects in which the disclosure may be practiced. Other aspects may be utilized and structural or logical changes may be made without departing from the concept of the present disclosure. Hence, the following detailed description is not to be taken in a limiting sense, and the concept of the present disclosure is defined by the appended claims.

Figure 1:
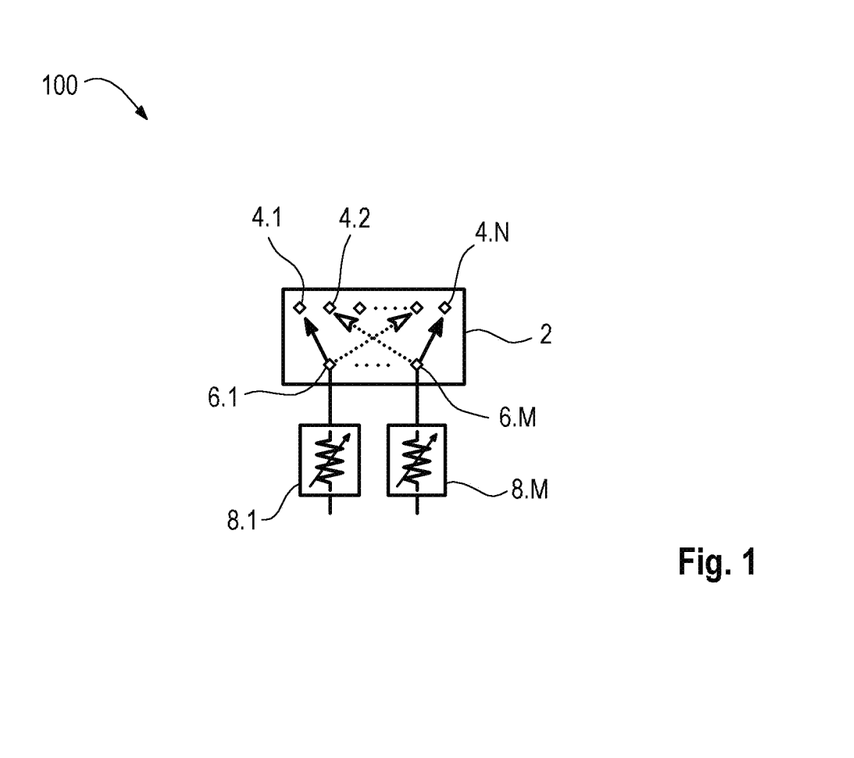
FIG. 1 illustrates a schematic diagram of a device 100 in accordance with the disclosure. The device 100 includes a switching unit and attenuators.

FIG. 1 illustrates a schematic diagram of a device 100 in accordance with the disclosure. The device 100 is illustrated in a general manner in order to qualitatively specify an aspect of the disclosure. The device 100 may include further components which are not illustrated for the sake of simplicity. For example, the device 100 may further include one or more components of other devices described herein.

The device 100 may include a switching unit 2 including N input ports 4.1 to 4.N and M output ports 6.1 to 6.M, wherein N≥M≥2. The switching unit 2 may be configured to selectively interconnect each of the M output ports 6.1 to 6.M with a different one of the N input ports 4.1 to 4.N. The device 100 may further include M attenuators 8.1 to 8.M, wherein each of the M attenuators 8.1 to 8.M may be electrically coupled to a different one of the M output ports 6.1 to 6.M of the switching unit 2.

The device 100 may be included in a radio transceiver, such as e.g. a portable cellular device, and in particular in an RF front end of a radio transceiver. During an operation of the radio transceiver, one or more components of the radio transceiver may need to be controlled or tuned in order to improve a transmission and/or reception behavior of the radio transceiver. In one example, the gain of a power amplifier arranged in a transmission/reception path of the RF front end may be controlled. In a further example, a transmission antenna of the radio transceiver may be tuned. A suitable control or tuning of such radio transceiver components may depend on properties (e.g. power, mismatch, etc.) of the analog RF transmission signals in the uplink transmission paths of the RF front end and/or parts of these signals reflected at the respective transmission antenna. Portions of the transmission signals and their reflected parts may thus need to be provided or fed back to control units (or feedback receivers) which are configured to control or tune the radio transceiver components. An example for such control unit may be a baseband processor of the radio transceiver.

Radio transceivers and RF front ends supporting uplink carrier aggregation technology may include multiple RF transmission paths operating on different transmit bands providing cellular signals with different center frequencies. The device 100 may be configured to suitably provide portions of the multiple RF transmission signals of the different transmission bands and their reflected parts to the control units (or feedback receivers). In addition, the device 100 may include additional (optional) components described below which may be configured to suitably process the signals to be fed back to the control units. The device 100 therefore represents a coupled path configurator supporting uplink carrier aggregation technology.

In this regard, the device 100 may receive portions of uplink RF transmission signals and/or their reflected parts at the N input ports 4.1 to 4.N of the switching unit 2. The switching unit 2 may selectively interconnect each of the M output ports 6.1 to 6.M with a different one of the N input ports 4.1 to 4.N. In the example of FIG. 1, a selected interconnection is indicated by solid arrows in the rectangle representing the switching unit 2. In addition, dashed arrows shall indicate other possible interconnections. Here, signals required by a control unit of the radio transceiver may be selected and output to the M attenuators 8.1 to 8.M. The M attenuators 8.1 to 8.M. may then optionally attenuate the selected signals, and the attenuated signals may be forwarded to the control unit. Note that a more detailed operation of a device similar to the device 100 is specified in connection with FIG. 13.

Figure 2:
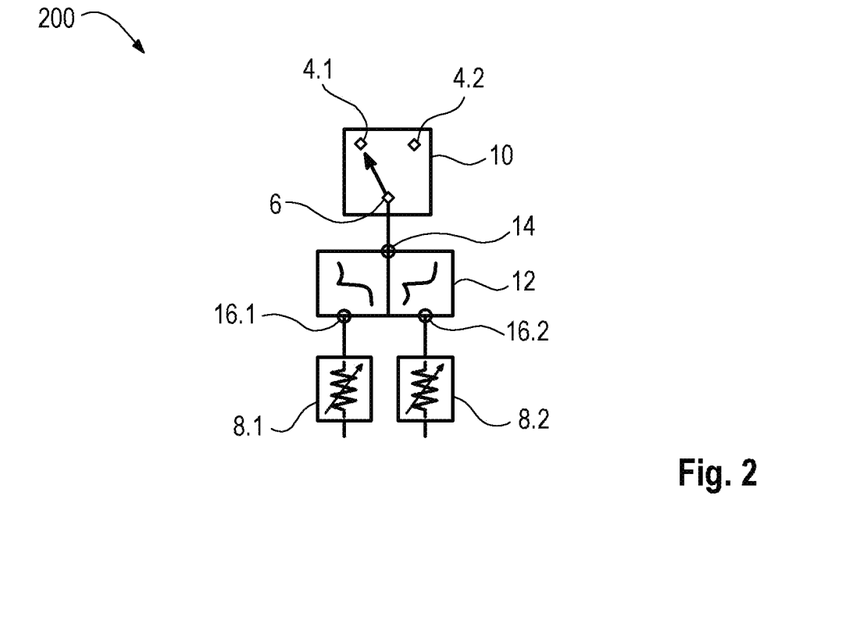
FIG. 2 illustrates a schematic diagram of a device 200 in accordance with the disclosure. The device 200 includes a single-pole double-throw switch, a diplexer and attenuators.

FIG. 2 illustrates a schematic diagram of a device 200 in accordance with the disclosure. The device 200 is illustrated in a general manner in order to qualitatively specify a further aspect of the disclosure. The device 200 may include further components which are not illustrated for the sake of simplicity. For example, the device 200 may further include one or more components of other devices described herein.

The device 200 may include a single-pole double-throw switch 10 comprising a first input port 4.1, a second input port 4.2 and an output port 6. The device 200 may further include a diplexer 12 comprising an input port 14, a first output port 16.1 and a second output port 16.2, wherein the input port 14 of the diplexer 12 is electrically coupled to the output port 6 of the single-pole double-throw switch 10. The device 200 may further include a first attenuator 8.1 electrically coupled to the first output port 16.1 of the diplexer 12 and a second attenuator 8.2 electrically coupled to the second output port 16.2 of the diplexer 12.

An operation of the device 200 may be at least partly similar to an operation of the device 100. The device 200 may receive a portion of an uplink RF transmission signals and/or its reflected part at the input ports 4.1 and 4.2 of the single-pole double-throw switch 10. In particular, the received signal may include portions of two different transmission bands having different center frequencies. The diplexer 12 may separate the signal into two signals including the contributions of the different transmission bands. The separated signals may be attenuated by the attenuators 8.1 and 8.2 before they are fed back to a control unit of the radio transceiver. Note that a more detailed operation of a device similar to the device 200 is specified in connection with FIG. 14.

Figures 3, 4:
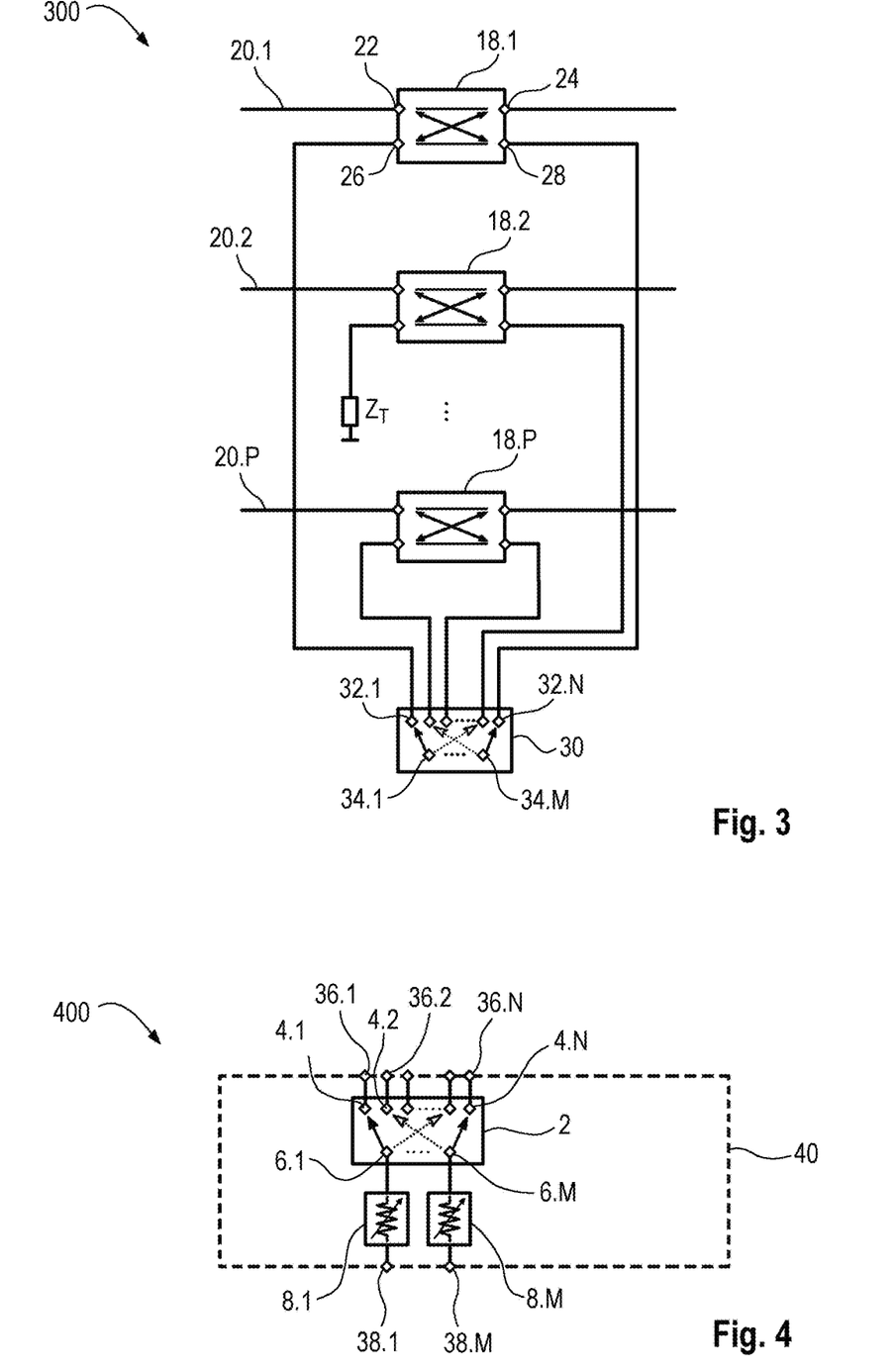
FIG. 3 illustrates a schematic diagram of a device 300 in accordance with the disclosure. The device 300 includes directional couplers and an M-pole N-throw switch.
FIG. 4 illustrates a schematic diagram of a device 400 in accordance with some examples. The device 400 includes a switching unit and attenuators.

FIG. 3 illustrates a schematic diagram of a device 300 in accordance with the disclosure. The device 300 is illustrated in a general manner in order to qualitatively specify a further aspect of the disclosure. The device 300 may include further components which are not illustrated for the sake of simplicity. For example, the device 300 may further include one or more components of other devices described herein.

The device 300 may include at least two directional couplers 18.1 to 18.P, i.e. P≥2. Each of the directional couplers 18.1 to 18.P may be configured to be arranged in an uplink transmission path 20.1 to 20.P of an RF front end. The example of FIG. 3 illustrates three directional couplers arranged in three uplink transmission paths. However, further examples may be based on a different number of directional couplers. Each of the directional couplers 18.1 to 18.P may include an input port 22, a transmitted port 24, an isolated port 26 and a coupled port 28. The device 300 may further include an M-pole N-throw switch 30 including N input ports 32.1 to 32.N and M output ports 34.1 to 34.M, wherein N≥M≥2. Each of the N input ports 32.1 to 32.N may be electrically coupled to a coupled port 28 of a directional coupler or an isolated port 26 of a directional coupler.

An operation of the device 300 may be at least partly similar to an operation of the device 100. The M-pole N-throw switch 30 may receive portions of uplink RF transmission signals at the N input ports 32.1 to 32.N from the coupled ports 28 of the directional couplers 18.1 to 18.P. In addition, the M-pole N-throw switch 30 may receive reflected parts of the uplink RF transmission signals from the isolated ports 26 of the directional couplers 18.1 to 18.P. The M-pole N-throw switch 30 may selectively interconnect each of the M output ports 34.1 to 34.M with a different one of the N input ports 32.1 to 32.N. Here, signals required by a control unit for controlling or tuning radio transceiver components may be selected. Note that a more detailed operation of a device similar to the device 300 is specified in connection with FIG. 13.

FIGS. 4 to 14 schematically illustrate devices 400 to 1400 in accordance with some examples. The devices 400 to 1400 may be seen as more detailed implementations of at least one of the devices 100 to 300 such that details of the devices 400 to 1400 described below may be likewise applied to at least one of the devices 100 to 300.

FIG. 4 illustrates a schematic diagram of a device 400 in accordance with some examples. The device 400 may be at least partly similar to the device 100 of FIG. 1 and may include similar components. Each of the M attenuators 8.1 to 8.M may be tunable, in particular digitally tunable. For example, the M attenuators 8.1 to 8.M may be controlled by a control unit such as e.g. a baseband processor of a digital baseband system. Each of the attenuators 8.1 to 8.M may be configured to attenuate input signals in a broad frequency range including the mobile frequency bands on which a radio transceiver may be operated. For example, an attenuation of each attenuator may be tuned to lie in a range from about 0 dB to about 16 dB. In one example, the switching unit 2 may include or may correspond to an M-pole N-throw switch. In a further example: M=2 and N=5.

The device 400 may further include N input ports 36.1 to 36.N, wherein each of the N input ports 36.1 to 36.N of the device 400 may be electrically coupled to a different one of the N input ports 4.1 to 4.N of the switching unit 2. In addition, the device 400 may include M output ports 38.1 to 38.M, wherein each of the M output ports 38.1 to 38.M of the device 400 may be electrically coupled to a different one of the M attenuators 8.1 to 8.M. The N input ports 36.1 to 36.N and M output ports 38.1 to 38.M of the device 400 may particularly represent external (or peripheral) ports of the device 400. For example, the ports may have the form of pins.

The switching unit 2 and the M attenuators 8.1 to 8.M may be monolithically integrated in a single semiconductor integrated circuit 40. In one example, the single semiconductor integrated circuit 40 may be a bulk CMOS integrated circuit. In a further example, the single semiconductor integrated circuit 40 may be a SOI (Silicon-on-Insulator) CMOS integrated circuit.

Figure 5:
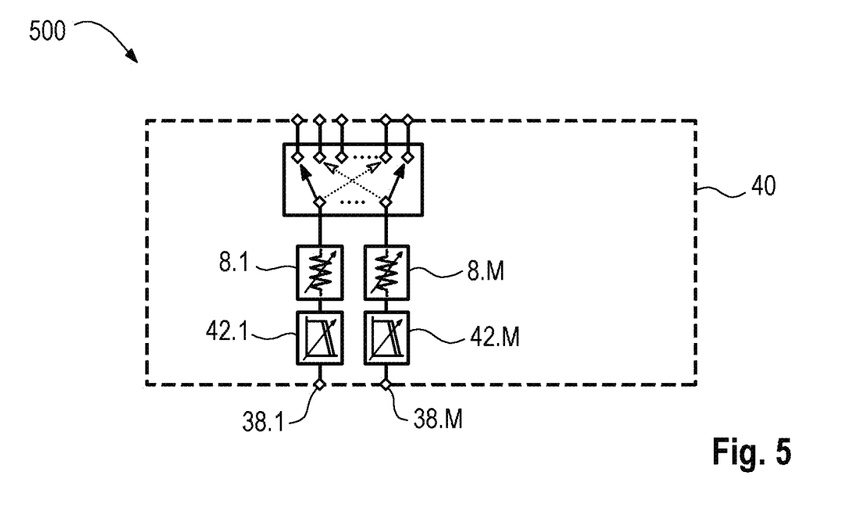
FIG. 5 illustrates a schematic diagram of a device 500 in accordance with some examples. The device 500 is similar to the device 400 and further includes low pass filters electrically coupled to the attenuators.

FIG. 5 illustrates a schematic diagram of a device 500 in accordance with some examples. The device 500 may be at least partly similar to the device 400 of FIG. 4 and may include similar components. In addition, the device 500 may include M low pass filters 41.1 to 42.M, wherein each of the M low pass filters 42.1 to 42.M may be interconnected between a different one of the M attenuators 8.1 to 8.M and a different one of the M output ports 38.1 to 38.M of the device 500. Each of the M low pass filters 42.1 to 42.M may be tunable, in particular digitally tunable. For example, the M low pass filters 42.1 to 42.M may be controlled by a control unit such as e.g. a baseband processor of a digital baseband system. In one example, all components of the device 500 may be monolithically integrated in a single semiconductor integrated circuit 40.

As explained above devices described herein may be configured to feedback uplink RF transmission signals of mobile frequency bands to a control unit of a radio transceiver. During an operation of the radio transceiver, signals of a Wi-Fi frequency band may also be transmitted or received by the radio transceiver, wherein a crosstalk of the Wi-Fi signals into the mobile frequency signals may occur. In one example, one or more of the M low pass filters 42.1 to 42.M may therefore be configured to attenuate or suppress at least one Wi-Fi frequency band in order to avoid an undesired crosstalk. For example, Wi-Fi frequency bands may be located at around 2.4 GHz and 5.8 GHz. In a further example, one or more of the M low pass filters 42.1 to 42.M may be configured to pass signals of at least one mobile communication frequency band, such as e.g. an LTE frequency band. In particular, the cutoff frequencies and characteristics of the M low pass filters 42.1 to 42.M may be chosen to attenuate or suppress at least one Wi-Fi frequency band and pass at least one mobile communication frequency band at the same time.

Figure 6:
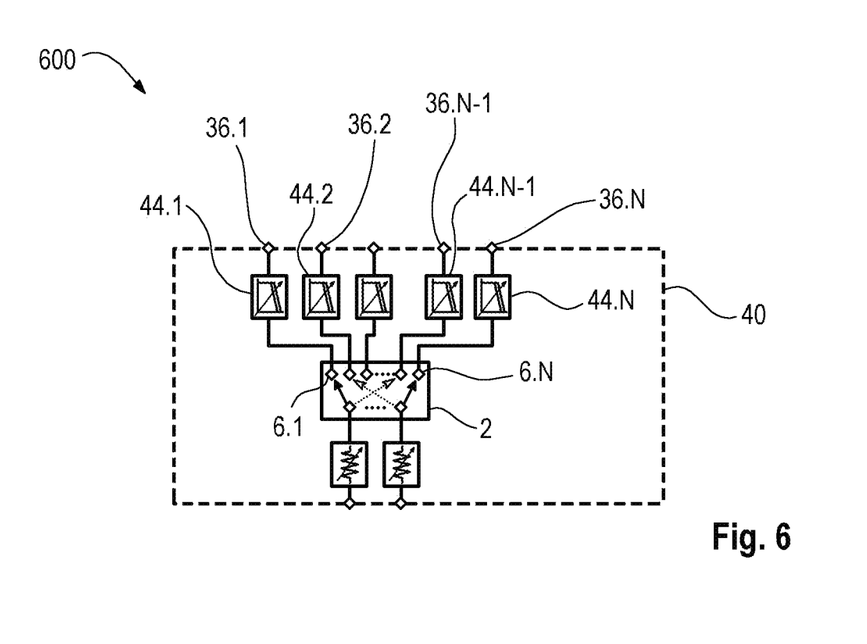
FIG. 6 illustrates a schematic diagram of a device 600 in accordance with some examples. The device 600 is similar to the device 400 and further includes low pass filters electrically coupled to the switching unit.

FIG. 6 illustrates a schematic diagram of a device 600 in accordance with some examples. The device 600 may be at least partly similar to the device 400 of FIG. 4 and may include similar components. In addition, the device 600 may include N low pass filters 44.1 to 44.N, wherein each of the N low pass filters 44.1 to 44.N may be interconnected between a different one of the N input ports 36.1 to 36.N of the device 600 and the N input ports 6.1 to 6.N of the switching unit 2. The N low pass filters 44.1 to 44.N may be similar to the M low pass filters 42.1 to 42.N of the device 500 such that comments made in connection with FIG. 5 may also hold true for FIG. 6. For example, all components of the device 600 may be monolithically integrated in a single semiconductor integrated circuit 40.

Figure 7:
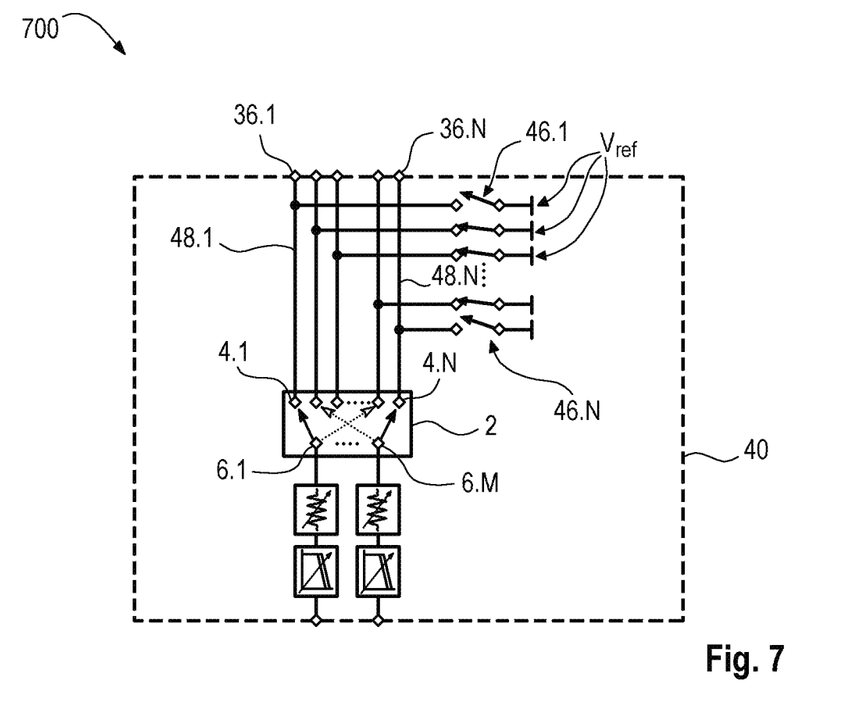
FIG. 7 illustrates a schematic diagram of a device 700 in accordance with some examples. The device 700 is similar to the device 500 and further includes switches electrically interconnected between a reference voltage and the switching unit.

FIG. 7 illustrates a schematic diagram of a device 700 in accordance with some examples. The device 700 may be at least partly similar to the device 500 of FIG. 5 and may include similar components. In addition, the device 700 may include N switches 46.1 to 46.N, wherein each of the N switches 46.1 to 46.N may be electrically interconnected between a reference voltage Vref and a different one of the N input ports 4.1 to 4.N of the switching unit 2. In this regard, each of the N switches 46.1 to 46.N may be electrically coupled to one of N lines 48.1 to 48.N interconnecting the N inputs 36.1 to 36.N of the device 700 and the N inputs 4.1 to 4.N of the switching unit 2. In particular, the N switches 46.1 to 46.N may be shunt switches. The reference voltage Vref may be a DC reference voltage, more particular ground. For example, all components of the device 700 may be monolithically integrated in a single semiconductor integrated circuit 40.

During an operation of the device 700, the switching unit 2 may selectively interconnect each of the M output ports 6.1 to 6.M with a different one of the N input ports 4.1 to 4.N. Accordingly, (N−M) of the input ports 4.1 to 4.N are not interconnected to any of the M output ports 6.1 to 6.M. Here, the M switches coupled to the M interconnected input ports may be open, while the (N−M) switches coupled to the (N−M) non-interconnected input ports may be closed. By closing the (N−M) switches associated with the (N−M) non-interconnected input ports, the M lines associated with the M interconnected input ports may be electrically decoupled from the (N−M) lines associated with the non-interconnected input ports. This way, an undesired crosstalk between the lines 48.1 to 48.N may be reduced. For example, opening and closing one or more of the switches 46.1 to 46.N may be controlled by a control unit such as e.g. a baseband processor of a digital baseband system.

Figure 8:
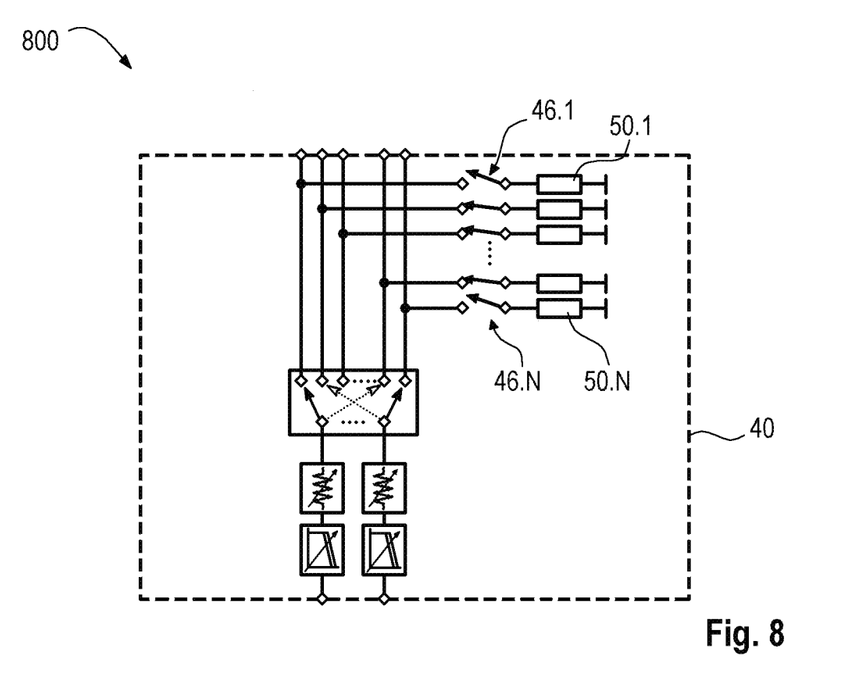
FIG. 8 illustrates a schematic diagram of a device 800 in accordance with some examples. The device 800 is similar to the device 700 and further includes resistors electrically interconnected between the switches and the reference voltage.

FIG. 8 illustrates a schematic diagram of a device 800 in accordance with some examples. The device 800 may be at least partly similar to the device 700 of FIG. 7 and may include similar components. In addition, the device 800 may include N resistors 50.1 to 50.N, wherein each of the N resistors 50.1 to 50.N may be electrically interconnected between a different one of the N switches 46.1 to 46.N and the reference voltage Vref. An opening and closing of the switches 46.1 to 46.N may be performed as described in connection with FIG. 7. Here, the resistors 50.1 to 50.N may enhance the described electrical decoupling between the lines associated with the closed switches and the lines associated with the open switches. For example, all components of the device 800 may be monolithically integrated in a single semiconductor integrated circuit 40.

Figure 9:
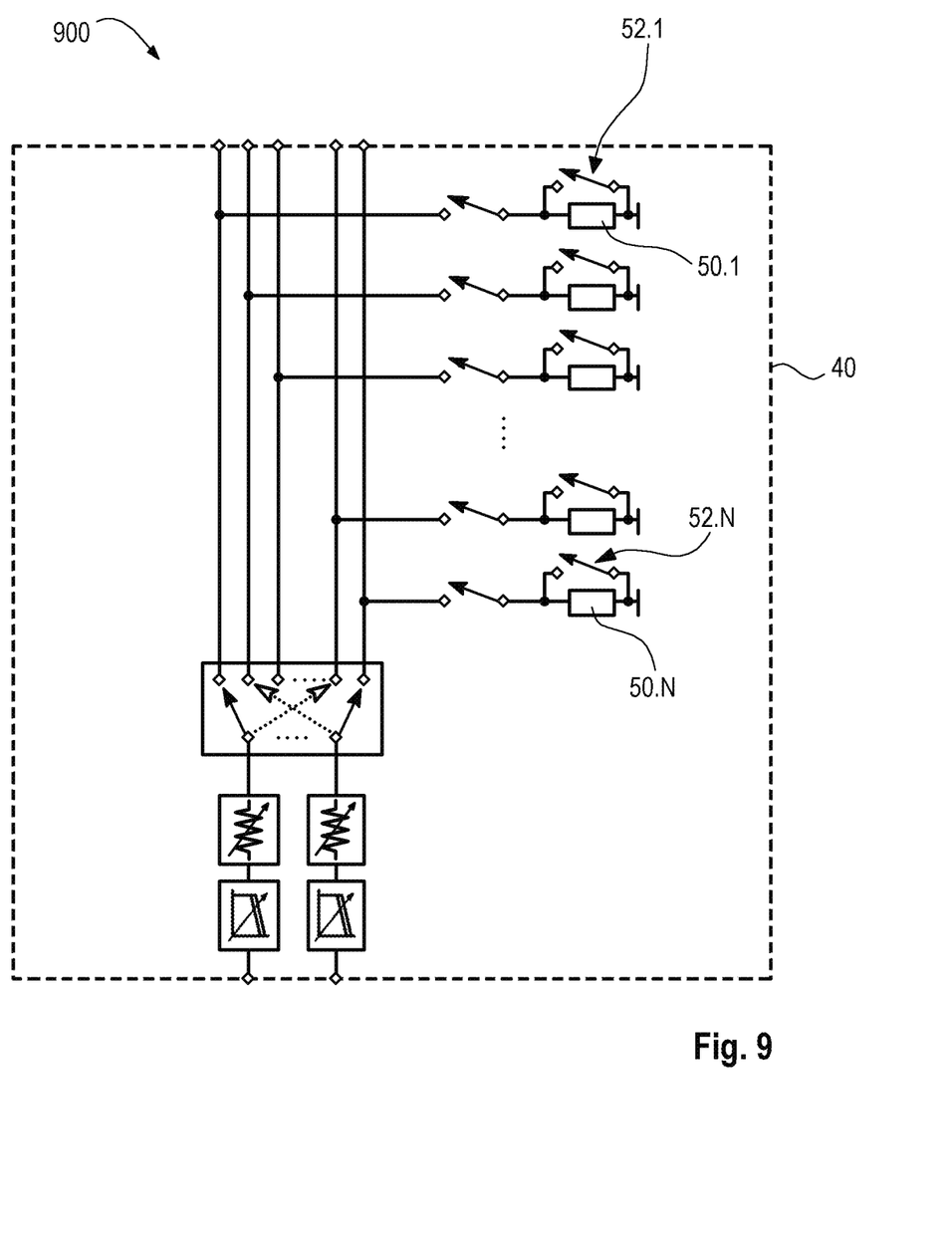
FIG. 9 illustrates a schematic diagram of a device 900 in accordance with some examples. The device 900 is similar to the device 800 and further includes switches configured to bypass the resistors.

FIG. 9 illustrates a schematic diagram of a device 900 in accordance with some examples. The device 900 may be at least partly similar to the device 800 of FIG. 8 and may include similar components. In addition, the device 900 may include N switches 52.1 to 52.N, wherein each of the N switches 52.1 to 52.N may be configured to bypass a respective one of the N resistors 50.1 to 50.M. In particular, the N switches 52.1 to 52.N may be RF switches. Opening and closing selected ones of the N switches 52.1 to 52.N may be controlled by a control unit such as e.g. a baseband processor of a digital baseband system. For example, all components of the device 900 may be monolithically integrated in a single semiconductor integrated circuit 40.

Figure 10:
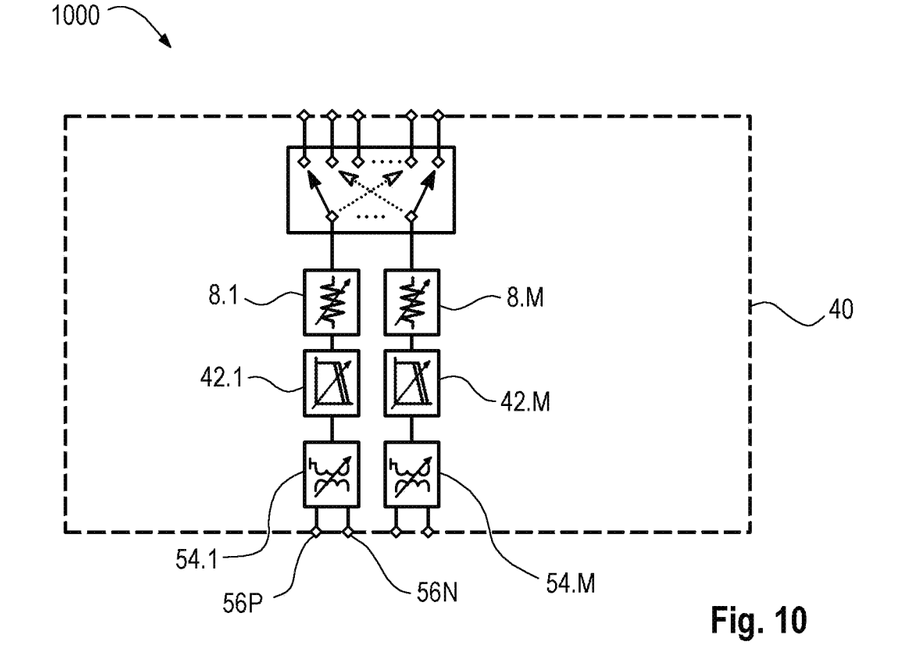
FIG. 10 illustrates a schematic diagram of a device 1000 in accordance with some examples. The device 1000 is similar to the device 500 and further includes single-ended to differential converters arranged downstream of the attenuators.

FIG. 10 illustrates a schematic diagram of a device 1000 in accordance with some examples. The device 1000 may be at least partly similar to the device 500 of FIG. 5 and may include similar components. In addition, the device 1000 may include M single-ended to differential converters 54.1 to 54.M, wherein each of the M single-ended to differential converters 54.1 to 54.M may be arranged downstream of a different one of the M attenuators 8.1 to 8.M. For example, all components of the device 1000 may be monolithically integrated in a single semiconductor integrated circuit 40.

Each of the M single-ended to differential converters 54.1 to 54.M may be configured to receive a single signal from a different one of the M low pass filters 42.1 to 42.M and convert the received signal into a differential signal which may be output at two output ports 56P and 56N. Here, the first output port 56P may provide a positive signal while the second output port 56N may provide a negative signal. Each of the M single-ended to differential converters 54.1 to 54.M may be tunable, in particular digitally tunable. For example, each of the M single-ended to differential converters 54.1 to 54.M may be tuned to optimize RF performance at a particular center frequency. The M single-ended to differential converters 54.1 to 54.M may be used in devices in accordance with the disclosure with a design preferring differential signal processing over single-ended processing.

Figure 11:
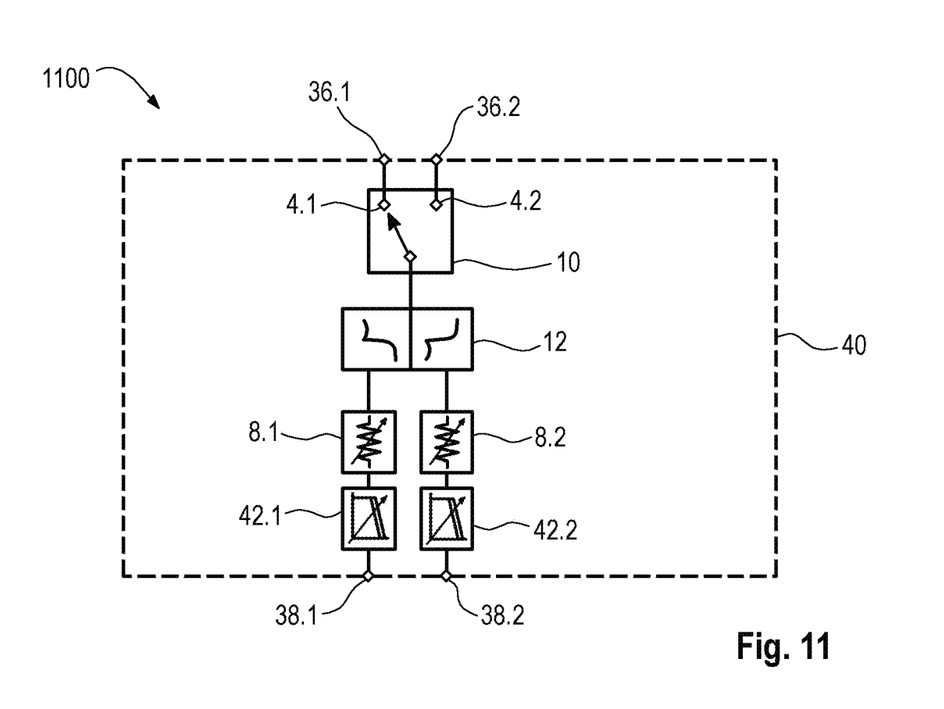
FIG. 11 illustrates a schematic diagram of a device 1100 in accordance with some examples. The device 1100 is similar to the device 200 and further includes low pass filters electrically coupled to the attenuators.

FIG. 11 illustrates a schematic diagram of a device 1100 in accordance with some examples. The device 1100 may be at least partly similar to the device 200 of FIG. 2 and may include similar components. In addition, the device 1100 may include two input ports 36.1 and 36.2, wherein each of the two input ports 36.1 and 36.2 of the device 1100 may be electrically coupled to a different one of the two input ports 4.1 and 4.2 of the single-pole double-throw switch 10. Further, the device 1100 may include two output ports 38.1 and 38.2 and two low pass filters 42.1 and 42.2, wherein each of the two low pass filters 42.1 and 42.2 may be interconnected between a different one of the two attenuators 8.1 and 8.2 and a different one of the two output ports 38.1 and 38.2. The input ports and output ports of the device 1100 may particularly represent external (or peripheral) ports of the device 1100 and may e.g. have the form of pins. For example, all components of the device 1000 may be monolithically integrated in a single semiconductor integrated circuit 40.

Figure 12:
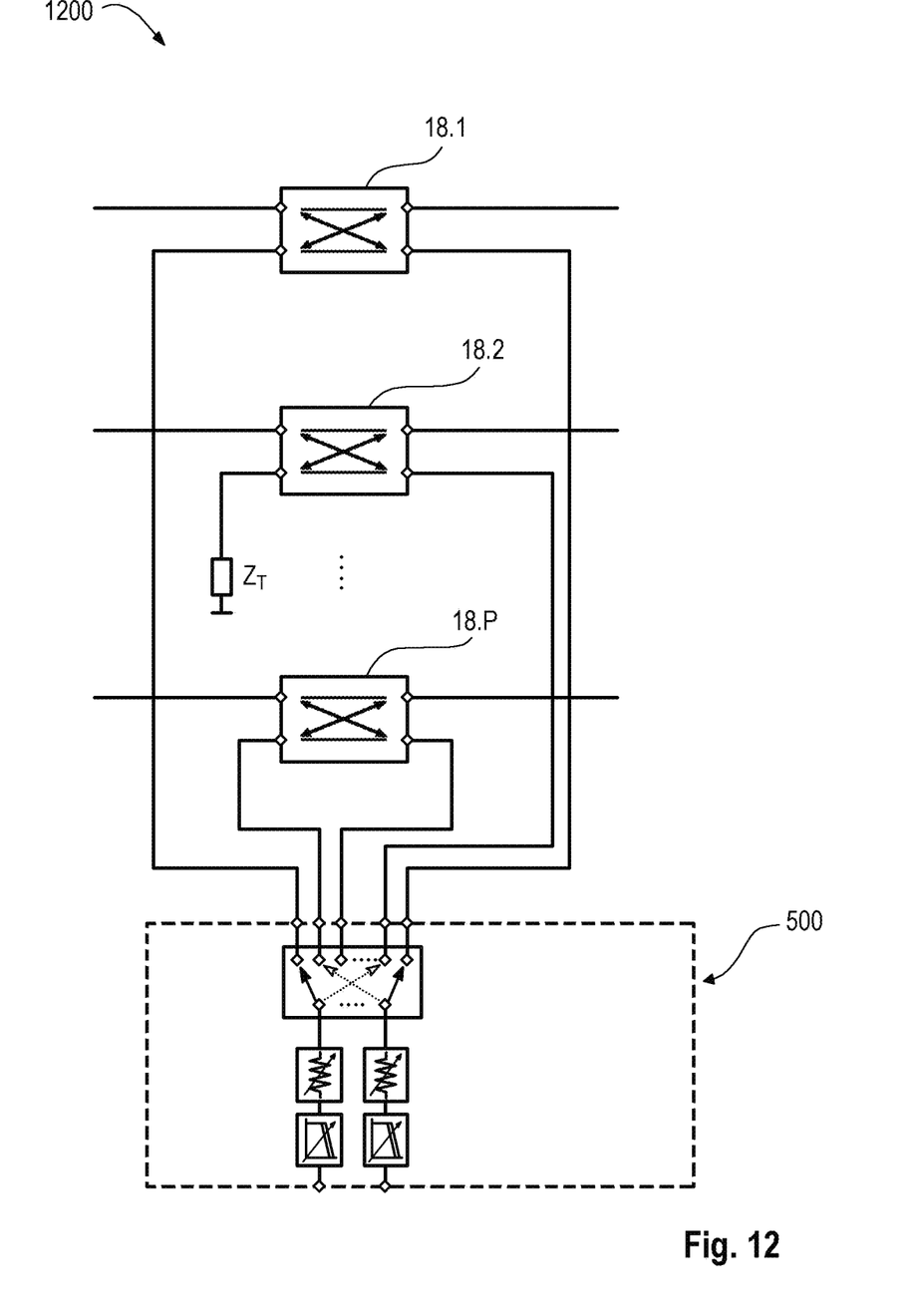
FIG. 12 illustrates a schematic diagram of a device 1200 in accordance with some examples. The device 1200 is similar to the device 500 and further includes directional couplers electrically coupled to the switching unit.

FIG. 12 illustrates a schematic diagram of a device 1200 in accordance with some examples. The device 1200 may be at least partly similar to the device 300 of FIG. 3 and may include similar components. In the example of FIG. 12, the directional couplers 18.1 to 18.P may be electrically coupled to a device similar to the device 500 of FIG. 5.

Figure 13:
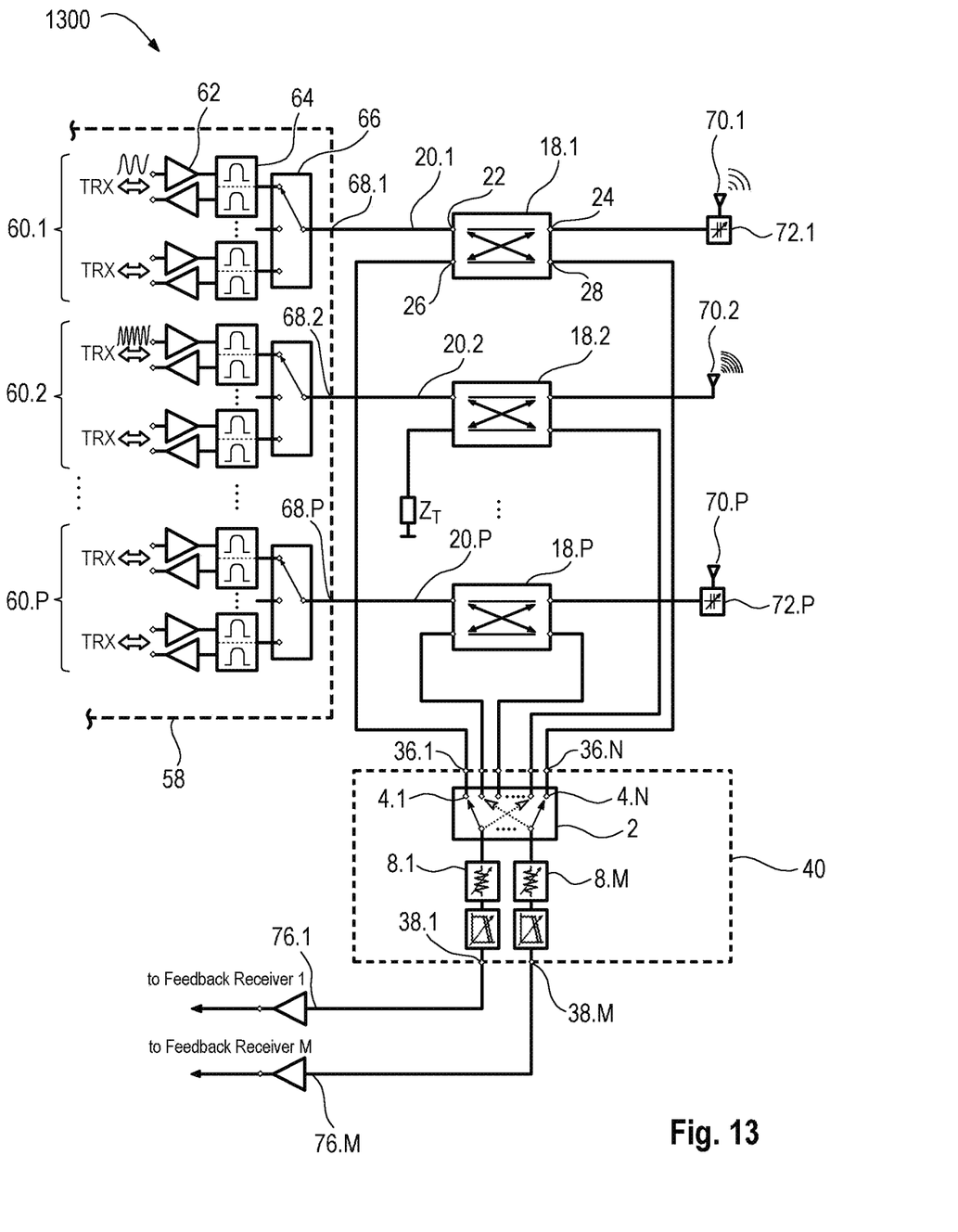
FIG. 13 illustrates a schematic diagram of a circuitry 1300 including a device in accordance with some examples similar to the device 500. The circuitry 1300 may be included in a radio transceiver.

FIG. 13 illustrates a schematic diagram of a circuitry 1300 including a device in accordance with some examples similar to the device 500. The circuitry 1300 may be included in a radio transceiver, in particular in an RF front end of a radio transceiver.

The circuitry 1300 may include a front end module 58 which may include multiple transmission-reception (TRX) sections 60.1 to 60.P. In general: P≥2, and in particular: 2≤P≤5. Each of the TRX sections 60.1 to 60.P may be optimized for a specific TRX frequency. For example, a respective TRX section may be configured to process (analog) signals of one of a low-band frequency in a range from about 699 MHz to about 960 MHz, a mid-band frequency in a range from about 1.4 GHz to about 2.2 GHz, a high-band frequency in a range from about 2.3 GHz to about 2.7 GHz, and an ultra-high-band frequency in a range from about 3.5 GHz to about 3.8 GHz. Each of the TRX sections 60.1 to 60.P may include multiple transmission (TX) paths and multiple reception (RX) paths, wherein each may inter alia include a power amplifier 62 and a filter 64. It is understood that the TX and RX paths may include further components which are not illustrated for the sake of simplicity. In each of the TRX sections 60.1 to 60.P, a multiplexer or switch 66 may select between the individual paths of the respective TRX section. The front end module 58 may include multiple output ports 68.1 to 68.P, wherein each of the multiple output ports 68.1 to 68.P may be electrically coupled to a different one of the TRX sections 60.1 to 60.P.

The circuitry 1300 may further include multiple directional couplers 18.1 to 18.P, each including an input port 22, a transmitted port 24, an isolated port 26 and a coupled port 28. For example, coupling factors of the directional couplers 18.1 to 18.P may lie in a range from about 20 dB to about 30 dB. Each of the input ports 22 of the directional couplers 18.1 to 18.P may be electrically coupled to a different one of the output ports 68.1 to 68.P of the front end module 58. Further, each of the transmitted ports 24 of the directional couplers 18.1 to 18.P may be electrically coupled to a different antenna 70.1 to 70.P. In particular, the antennas 70.1 to 70.P may be configured to transmit signals of a mobile communication frequency band. One or more of the antennas 70.1 to 70.P may be tunable and, if so, electrically coupled to an antenna tuner 72.1 to 72.P. The circuitry 1300 may include an additional antenna (not illustrated) configured to transmit signals of a Wi-Fi frequency band.

Each of the coupled ports 28 of the directional couplers 18.1 to 18.P may be electrically coupled to a different input port 36 of an integrated circuit 40. If a directional coupler 18 is electrically coupled to an antenna 70 including an antenna tuner 72, the isolated port 26 of the respective directional coupler 18 may be electrically coupled to an input port 36 of the integrated circuit 40. If a directional coupler 18 is electrically coupled to an antenna 70 not including an antenna tuner 72, the isolated port 28 of the directional coupler 18 may be electrically coupled to a terminating impedance ZT.

The integrated circuit 40 may be similar to the device 500 of FIG. 5 such that comments made in connection with FIG. 5 may also hold true for FIG. 13. Each of the output ports 38.1 to 38.M of the integrated circuit 40 may be electrically coupled to a different one of multiple feedback paths 76.1 to 76.M including a power amplifier and additional components which are not illustrated for the sake of simplicity. Each of the feedback paths 76.1 to 76.M may be electrically coupled to a control unit (or feedback receiver) of a radio transceiver, in particular its baseband system.

In an exemplary operational TX mode, a radio transceiver including the circuitry 1300 may transmit TX signals via the first antenna 70.1 and the second antenna 70.2. Here, a TX path of the first TRX section 60.1 may process TX signals of a low frequency band, and a TX path of the second TRX section 60.2 may process TX signals of a mid-frequency band. The processed low frequency band signal may be input to the input port 22 of the first directional coupler 18.1. A first portion of the input signal may be output to the first antenna 70.1 via the transmitted port 24, wherein the output first portion may be at least partly reflected at the first antenna 70.1. The reflected part may be output at the isolated port 26 of the first directional coupler 18.1 and forwarded to one of the input ports 36.1 to 36.N of the integrated circuit 40. A second portion of the signal input to the input port 22 may be output at the coupled port 28 and forwarded to one of the input ports 36.1 to 36.N of the integrated circuit 40. The processed mid frequency band may be input to the second directional coupler 18.2 and processed in a similar fashion. However, since the second antenna 70.2 may not be tuned by an antenna tuner, the signal reflected at the second antenna 70.2 is not forwarded to one of the inputs 36.1 to 36.N of the integrated circuit 40, but to a terminating impedance ZT.

Accordingly, in the specified exemplary TX mode, three inputs of the switching unit 2 may receive signals from the directional couplers 18.1 to 18.P, namely a signal from the coupled port 28 of the first directional coupler 18.1, a signal from the isolated port 26 of the first directional coupler 18.1 and a signal from the coupled port 28 of the second directional coupler 18.2. Since only the two TRX sections 60.1 and 60.2 of the front end module 58 actively process signals in the considered exemplary operational TX mode, the remaining (M−3) inputs of the switching unit 2 may not necessarily receive signals from the directional couplers 18.1 to 18.P.

The switching unit 2 may be controlled by a control unit (e.g. a baseband processor of the radio transceiver) to selectively interconnect three of the M output ports with a different one of the three input ports of the switching unit 2 receiving the three signals from the directional couplers 18.1 and 18.2. The three signals may then be forwarded from the output ports 38 of the integrated circuit 40 to one or more control units (or feedback receivers) via a respective feedback path 76. For example, the three signals may be forwarded to a baseband processor of the radio transceiver for further processing.

In a first example, a transmission and/or reception quality of the radio transceiver may depend on a property (e.g. a power) of the TX signal in the first transmission path 20.1. For example, the power of the TX signal may need to be in a specific range to ensure a good transmission quality. Based on the portion of the TX signal fed back to the control unit of the radio transceiver via the coupled port 28 of the first directional coupler 18.1 and the integrated circuit 40, the control unit may e.g. control the gain of the power amplifier 62 in the TX path of the first TRX section 60.1 in order to optimize the TX signal in a suitable manner. In a similar fashion, the control unit may control the gain of the power amplifier 62 in the TX path of the second TRX section 60.2 based on the portion of the TX signal fed back to the control unit via the coupled port 28 of the second directional coupler 18.2 and the integrated circuit 40.

In a second example, a transmission and/or reception quality of the radio transceiver may depend on a property of the part of the TX signal reflected at the first antenna 70.1. For example, a mismatch loss may occur due to the reflected signal parts. Based on the portion of the reflected TX signal fed back to the control unit of the radio transceiver via the isolated port 26 of the first directional coupler 18.1 and the integrated circuit 40, the control unit may e.g. tune and optimize a transmission behavior of the antenna 70.1. For example, an impedance of the antenna 70.1 may be optimized by suitably controlling the antenna tuner 72.1 such that an occurring mismatch loss may be reduced.

Figure 14:
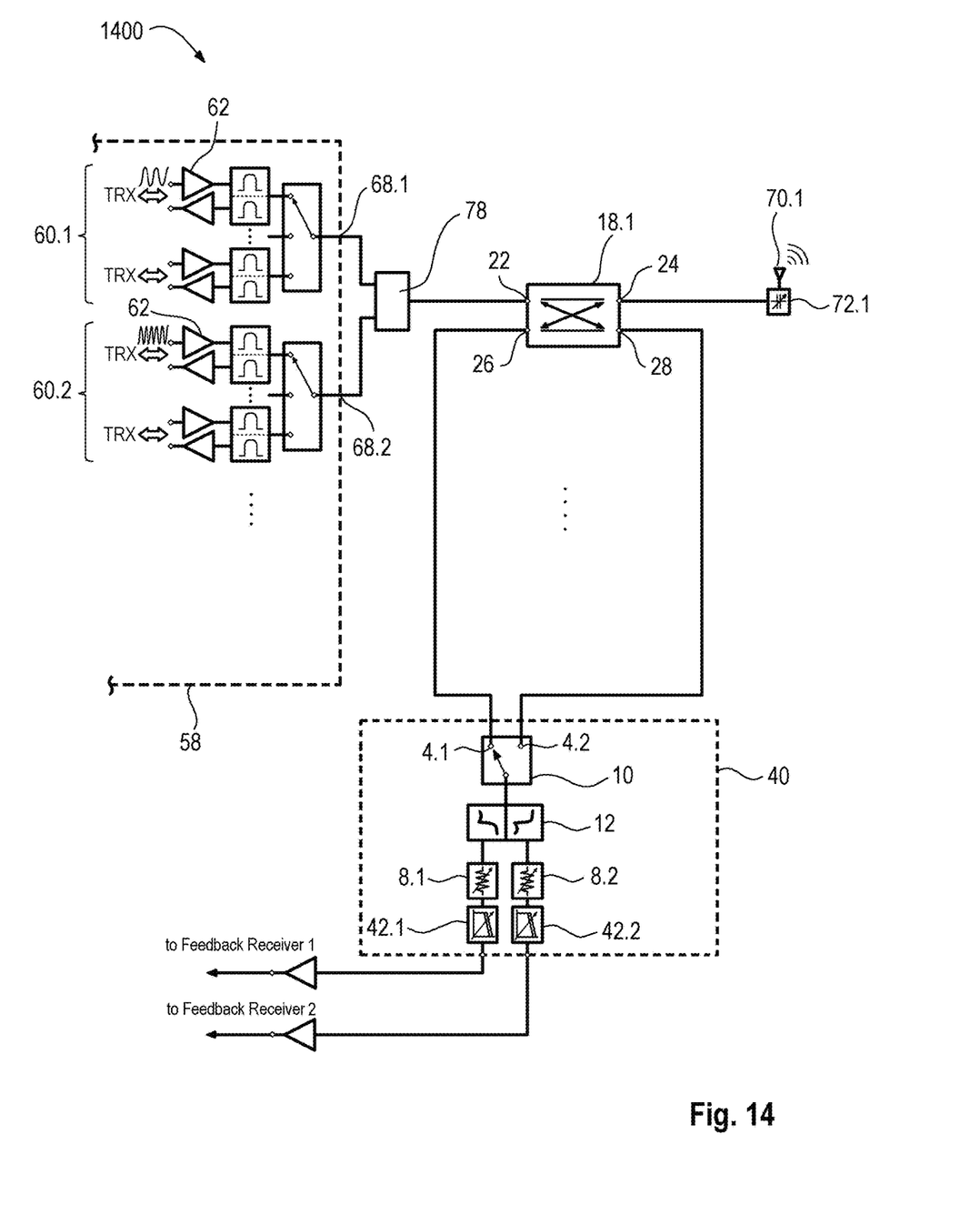
FIG. 14 illustrates a schematic diagram of a circuitry 1400 including a device in accordance with some examples similar to the device 1100. The circuitry 1400 may be included in a radio transceiver.

FIG. 14 illustrates a schematic diagram of a circuitry 1400 including a device in accordance with some examples similar to the device 1100. The circuitry 1400 may be included in a radio transceiver, in particular in an RF front end of a radio transceiver.

The circuitry 1400 may include a front end module 58 including a first TRX section 60.1 and a second TRX section 60.2 which may be similar to the TRX sections 60.1 to 60.P of FIG. 13. In addition, the circuitry 1400 may include a multiplexer 78, a directional coupler 18.1, an antenna 70.1 and an integrated circuit 40 which may be similar to the device 1100 of FIG. 11. It is noted that the circuitry 1400 may include further TRX sections and directional couplers which are not illustrated for the sake of simplicity. The integrated circuit 40 may be coupled to two feedback paths.

In an exemplary operational TX mode, a radio transceiver including the circuitry 1400 may transmit TX signals via the first antenna 70.1. Here, a TX path of the first TRX section 60.1 may process TX signals of a low frequency band, and a TX path of the second TRX section 60.2 may process TX signals of a mid-frequency band. The first and second processed signal may be forwarded to the multiplexer 78 where the signals are multiplexed into a serial TX signal. That is, the serial TX signal may include low frequency band contributions and mid frequency band contributions. The serial TX signal may be input to the directional coupler 18.1 at the input port 22. As explained in connection with FIG. 13, a portion of the serial TX signal may be output at the coupled port 28 and a reflected part of the serial TX signal may be output at the isolated port 26.

The signals output at the isolated port 26 and the coupled port 28 may be received at the first input 4.1 and the second input 4.2 of the single-pole double-throw switch 10, respectively. A control unit, such as e.g. a baseband processor of a radio transceiver, may control the single-pole double-throw switch 10 to selectively interconnect its output to one of its inputs 4.1 and 4.2. The diplexer 12 may receive the selected signal from the single-pole double-throw switch 10 and separate the low frequency band contribution and high frequency band part contribution of the selected signal. The separated signal contributions may be output at the two output ports of the diplexer 12. After attenuating and filtering the separated low frequency part and high frequency part, the signals may be fed back to one or more control units of the radio transceiver as already discussed in connection with FIG. 13.

In a first example, the control unit may e.g. control the gain of one or more of the power amplifiers 62 in the TX paths of the TRX sections 60.1 and 60.2 in order to optimize a transmission behavior of the radio transceiver including the circuitry 1400. Such control may be based on the portion of the TX signal fed back to the control unit via the coupled port 28 of the directional coupler 18.1 and the integrated circuit 40. Here, the single-pole double-throw switch 10 may selectively interconnect its output to its second input 4.2 such that the required signal is fed back to the control unit.

In a second example, the control unit may e.g. tune the antenna 70.1 by means of the antenna tuner 72.1 in order to optimize a transmission behavior of the radio transceiver including the circuitry 1400. Such tuning may be based on the portion of the reflected TX signal fed back to the control unit of the radio transceiver via the isolated port 26 of the directional coupler 18.1 and the integrated circuit 40. Here, the single-pole double-throw switch 10 may selectively interconnect its output to its first input 4.1 such that the required signal is fed back to the control unit.

As employed in this specification, the terms "connected", "coupled", "electrically connected" and/or "electrically coupled" may not necessarily mean that elements must be directly connected or coupled together. Intervening elements may be provided between the "connected", "coupled", "electrically connected" or "electrically coupled" elements.

Furthermore, to the extent that the terms "having", "containing", "including", "with" or variants thereof are used in either the detailed description or the claims, such terms are intended to be inclusive in a manner similar to the term "comprising". That is, as used herein, the terms "having", "containing", "including", "with", "comprising" and the like are open-ended terms that indicate the presence of stated elements or features, but do not preclude additional elements or features. The articles "a", "an" and "the" are intended to include the plural as well as the singular, unless the context clearly indicates otherwise.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, at least one of A and B or the like generally means A or B or both A and B.

Devices and methods performed by such devices are described herein. Comments made in connection with a described device may also hold true for a method performed by the device and vice versa. For example, if a specific component of a device is described, a corresponding method performed by the device may include an act of operating the component in a suitable manner, even if such act is not explicitly described or illustrated in the figures. In addition, the features of the various exemplary aspects and examples described herein may be combined with each other, unless specifically noted otherwise.

Although the disclosure has been shown and described with respect to one or more implementations, equivalent alterations and modifications will occur to others skilled in the art based at least in part upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

What is claimed is:

1. A device, comprising:
a single-pole double-throw switch comprising a first input port, a second input port, and an output port;
a diplexer comprising an input port, a first output port, and a second output port, wherein the input port of the diplexer is electrically coupled to the output port of the single-pole double-throw switch, the diplexer being configured to separate transmission signals received at the input port into a first frequency band and a second frequency band such that, for each position of the single-pole double-throw switch, a transmission signal associated with the first frequency band is coupled to the first output port, and a transmission signal associated with the second frequency band is coupled to the second output port;
a first attenuator, electrically coupled to the first output port of the diplexer, configured to attenuate the transmission signal associated with the first frequency band; and
a second attenuator, electrically coupled to the second output port of the diplexer, configured to attenuate the transmission signal associated with the second frequency band.

2. The device of claim 1, wherein the first input port of the single-pole double-throw switch is configured to be electrically coupled to a coupled port of a directional coupler, and wherein the second input port of the single-pole double-throw switch is configured to be electrically coupled to an isolated port of the directional coupler.

3. The device of claim 2, wherein an input port of the directional coupler is electrically coupled to an output port of a multiplexer, and
wherein input ports of the multiplexer are electrically coupled to at least two different uplink transmission paths of an RF front end.

4. The device of claim 1, wherein the single-pole double-throw switch is controlled by a baseband processor.

5. The device of claim 1, wherein the single-pole double-throw switch, the diplexer, the first attenuator, and the second attenuator are monolithically integrated in a single semiconductor integrated circuit.

6. The device of claim 1, further comprising:
a first low pass filter electrically coupled to an output port of the first attenuator; and
a second low pass filter electrically coupled to an output port of the second attenuator.

7. The device of claim 6, wherein the first low pass filter and the second low pass filter are configured to attenuate a Wi-Fi frequency band.

8. The device of claim 6, wherein the first low pass filter and the second low pass filter are configured to pass a mobile communication frequency band.

9. A device, comprising:
at least two directional couplers, wherein each of the at least two directional couplers is configured to be arranged in an uplink transmission path of an RF front end;
an M-pole N-throw switch comprising N input ports and M output ports, wherein N≥M≥2;
N switches, wherein each of the N switches is electrically interconnected between a reference voltage and a different one of the N input ports of the M-pole N-throw switch; and
N resistors, wherein each of the N resistors is electrically interconnected between a different one of the N switches and the reference voltage,
wherein each of the N input ports is electrically coupled to (i) a coupled port or (ii) an isolated port of a directional coupler from among the at least two directional couplers.

10. The device of claim 9, wherein the at least two directional couplers and the M-pole N-throw switch are monolithically integrated in a single integrated circuit.

11. The device of claim 9, wherein M=2 and N=5.

12. The device of claim 9, wherein each of the M output ports of the device is configured to be electrically coupled to a processor, and
wherein the processor is configured to tune an uplink antenna or a power amplifier arranged in the uplink transmission path of the RF front end based on an output of the device.

13. The device of claim 9, wherein the M-pole N-throw switch is controlled by a baseband processor.

14. A computer-implemented method, comprising:
receiving, via a single-pole double-throw switch, a transmission signal at one of a first input port or a second input port;
separating, via a diplexer coupled to an output of the single-pole double-throw switch, the transmission signal into a first transmission signal and a second transmission signal such that, for each position of the single-pole double-throw switch, the first transmission signal is coupled to a first output port of the diplexer and the second transmission signal is coupled to a second output port of the diplexer, the first transmission signal and the second transmission signal having respective transmission bands centered about different frequencies;
attenuating, via a first attenuator electrically coupled to the first output port of the diplexer, the first transmission signal to provide an attenuated first transmission signal; and
attenuating, via a second attenuator electrically coupled to the second output port of the diplexer, the second transmission signal to provide an attenuated second transmission signal.

15. The computer-implemented method of claim 14, further comprising:
controlling, via a baseband processor, the single-pole double-throw switch to couple the transmission signal received at the first port or the second input port to the diplexer.

16. The computer-implemented method of claim 14, further comprising:
filtering, via a first low pass filter electrically coupled to an output port of the first attenuator, the attenuated first transmission signal; and
filtering, via a second low pass filter electrically coupled to an output port of the second attenuator, the attenuated second transmission signal.

17. The computer-implemented method of claim 16, wherein the act of filtering the attenuated first transmission signal via the first low pass filter and the act of filtering the attenuated second transmission signal via the second low pass filter include, respectively, attenuating a Wi-Fi frequency band.

18. The computer-implemented method of claim 17, wherein the act of filtering the attenuated first transmission signal via the first low pass filter and the act of filtering the attenuated second transmission signal via the second low pass filter include, respectively, passing a mobile communication frequency band.

19. The device of claim 2, wherein the isolated port of the directional coupler couples a reflected part of a transmission signal to the second input port of the single-pole double-throw switch.

20. The device of claim 1, wherein:
when the first input port is coupled to the output port of the single-pole double-throw switch, the output port provides a transmitted portion of a transmission signal, and
when the second input port is coupled to the output port of the single-pole double-throw switch, the output port provides a reflected portion of the transmission signal.

* * * * *